United States Patent
Lempicki et al.

(10) Patent No.: US 11,541,745 B2
(45) Date of Patent: Jan. 3, 2023

(54) ASSEMBLY FOR A FLUID TANK COMPRISING A BAFFLE AND A FLUID TRANSFER LINE PASSING THROUGH THE BAFFLE

(71) Applicant: Plastic Omnium Advanced Innovation and Research, Brussels (BE)

(72) Inventors: Jeremy Lempicki, Lake Orion, MI (US); Masa Higashi, Rochester Hills, MI (US); James Grech, Clinton Township, MI (US); Syed Habib, Dearborn, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 35 days.

(21) Appl. No.: 17/268,016

(22) PCT Filed: Aug. 23, 2019

(86) PCT No.: PCT/EP2019/072600
§ 371 (c)(1),
(2) Date: Feb. 11, 2021

(87) PCT Pub. No.: WO2020/039076
PCT Pub. Date: Feb. 27, 2020

(65) Prior Publication Data
US 2021/0237559 A1 Aug. 5, 2021

(30) Foreign Application Priority Data
Aug. 24, 2018 (EP) .................................... 18190854

(51) Int. Cl.
*B60K 15/03* (2006.01)
*B60K 15/077* (2006.01)
*B29L 31/00* (2006.01)

(52) U.S. Cl.
CPC ...... *B60K 15/03177* (2013.01); *B60K 15/077* (2013.01); *B29L 2031/7172* (2013.01);
(Continued)

(58) Field of Classification Search
CPC .......... B60K 15/077; B60K 2015/0344; B60K 2015/0775; B60K 2015/0777
See application file for complete search history.

(56) References Cited

U.S. PATENT DOCUMENTS 7,318,445 B2 * 1/2008 Ohshiro ........... B60K 15/03519
137/202
8,276,778 B2 * 10/2012 Eulitz .............. B29O 66/53247
220/660

(Continued)

FOREIGN PATENT DOCUMENTS

DE 198 14 965 A1 10/1999
EP 3 141 484 A1 3/2017

OTHER PUBLICATIONS

International Search Report dated Oct. 24, 2019 in PCT/EP2019/072600 filed on Aug. 23, 2019.

*Primary Examiner* — Andrew T Kirsch
(74) *Attorney, Agent, or Firm* — Oblon, McClelland, Maier & Neustadt, L.L.P.

(57) ABSTRACT

An assembly for a fluid tank includes a baffle and a fluid transfer line. The baffle includes a first deflecting surface defining a first part of the tank and a second deflecting surface defining a second part of the tank. The fluid transfer line extends from the first part to the second part and is linked to the baffle by a linkage supported by the assembly. The extension of the fluid transfer line in the first part defines a first portion of the fluid transfer line, and the extension of the fluid transfer line in the second part defines a second portion of the fluid transfer line. The linkage allows for simultaneous rotation of the first portion and the second (Continued)

portion of the fluid transfer line towards a surface including one of the deflecting surfaces.

18 Claims, 4 Drawing Sheets

(52) U.S. Cl.
CPC ............... *B60K 2015/0344* (2013.01); *B60K 2015/03467* (2013.01); *B60K 2015/0777* (2013.01); *B60Y 2410/113* (2013.01)

(56) References Cited

U.S. PATENT DOCUMENTS

2017/0066542 A1   3/2017  James et al.
2019/0128227 A1*  5/2019  Amano .................. B60K 15/03

* cited by examiner

ASSEMBLY FOR A FLUID TANK COMPRISING A BAFFLE AND A FLUID TRANSFER LINE PASSING THROUGH THE BAFFLE

The invention relates to an assembly for a fluid tank comprising a baffle and a fluid transfer line passing through the baffle.

Within a fluid tank, especially a fuel tank or a tank for ammonia, a baffle is used as a divider. In a vehicle, the baffle constrains the motion of the fluid within the tank and prevents it from sloshing. The tank may be required to be inclined at an angle. The effect of gravity then causes the fluid to travel to one end of the tank, where it may be difficult to capture. A fluid transfer line is used, which can reach the fluid at an extremity of the tank and draw it out. The fluid tank also contains internal vapors that are necessary to transfer between valves or other internal connection points. Vapor lines may be used internal to the fuel tank to transfer this vapor.

The difficulty lies in the installation of the baffle and fluid transfer line within the tank. Once the tank has been molded, the baffle and fluid transfer line must both be inserted into the tank through a small opening.

A known solution for fitting the baffle through the opening is by using a baffle equipped with springs, which allow the baffle to be temporarily compressed in order to facilitate its insertion through the small opening into the tank. Usually the fluid transfer line is fixed to the baffle after the baffle has been inserted into the tank. However, the manipulation of the fluid transfer line in the tank to connect it to the baffle is difficult because the baffle is only accessible through the small opening. When the fluid transfer line is connected after the baffle is installed in the tank, internal testing is required to ensure a proper connection.

Another solution is, before inserting the baffle into the tank, pre-installing the fluid transfer line to the baffle with a rigid connection. However, with the fluid transfer line and baffle being rigidly connected, the fluid transfer line must be severely bent to fit through the opening in the tank which may cause damages.

The invention aims to insert a pre-assembled fluid transfer line and baffle through an opening in a tank without bending the fluid transfer line and without requiring internal testing.

Hence, the invention relates to an assembly for a fluid tank comprising:

a baffle, comprising a first deflecting surface intended to define a first part of the tank and a second deflecting surface intended to define a second part of the tank, a fluid transfer line intended to extend from the first part to the second part and being linked to the baffle by a means of linkage supported by the assembly, wherein the extension of the fluid transfer line in the first part defines a first portion of the fluid transfer line and wherein the extension of the fluid transfer line in the second part defines a second portion of the fluid transfer line. This assembly is characterized in that the means of linkage allows for simultaneous rotation of the first portion and the second portion of the fluid transfer line towards a surface comprising one of the deflecting surfaces.

This allows for the fluid transfer line to be linked to the baffle prior to insertion into the tank. Thus, the fluid transfer line is easily and correctly connected to the baffle. Moreover, the fluid transfer line does not have to be bent in order to limit the footprint of the assembly and can be easily rotated simultaneously towards the surface comprising one of the deflecting surfaces of the baffle in order to limit the footprint of the assembly. This also prevents damage to the assembly components, such as kinking or tearing of the fluid transfer line. By the term "fluid", we intend to mean a liquid, a gas or a mixture thereof. During its introduction into the tank, the fluid transfer line can thus be rotated simultaneously on both sides of the baffle and folded down against the baffle. The rotation is operated around an axis corresponding to the means of linkage and generally perpendicular to the axis of the fluid transfer line so that the fluid transfer line is rotating in a plane generally perpendicular to the plane of the baffle. The rotation angle is larger than 10°, preferably comprised between 10 and 60°, more preferably between 15 and 60° and most preferably between 30 and 60°. This last range for the angle allows a considerable saving of hinderance and allows for an easy insertion of the preassembly (baffle and fluid transfer line) in the tank.

The assembly for a tank according to the invention can further comprise the following optional features:

The fluid transfer line is linked to an internal peripheral edge of the baffle defining a passing hole extending between the two deflecting surfaces of the baffle, the fluid transfer line passing through the passing hole in the baffle.

Thus, the fluid transfer line can be easily rotated towards a surface comprising one of the deflecting surfaces of the baffle in order to limit the footprint of the assembly.

The fluid transfer line is linked to an external peripheral edge of the baffle defining for example an indentation located on the edge of the baffle.

Thus, the fluid transfer line can alternatively be easily rotated towards a surface comprising one of the deflecting surfaces of the baffle in order to limit the footprint of the assembly.

The means of linkage is chosen between a pivot linkage and a sliding pivot linkage.

Either of these linkages allows for rotation of the fluid transfer line. The means of linkage also restricts the degree of freedom of the fluid transfer line in order to facilitate the use of the assembly during the manufacturing of the vehicle tank. This ensures that the fluid transfer line moves only as desired and does have any other motion which may interfere with its function of drawing fluid from the tank or transferring vapors between internal component connection points.

The means of linkage comprises a post supported by the baffle and a bearing connected to the fluid transfer line, the post being configured to receive the bearing.

Thus, the post provides a location for the bearing to rotate about. The bearing being connected to the fluid transfer line allows for the fluid transfer line to be rotated about the post.

The fluid transfer line comprises an upstream tube part, a downstream tube part, and a hollow cylindrical element connecting the upstream tube part to the downstream tube part, the bearing being connected to the fluid transfer line via the hollow cylindrical element, the hollow cylindrical element allowing fluid to flow through the means of linkage.

The hollow cylindrical element allows for the bearing to be connected to both the upstream tube part and downstream tube part, hence they can both be rotated about the post. The hollow cylindrical element does not inhibit the flow of fluid through the fluid transfer line.

The means of linkage comprises a post supported by the fluid transfer line and a bearing connected to the baffle, the post being configured to receive the bearing.

Thus, the post provides a location for the bearing to rotate about. The bearing being connected to the baffle allows for the fluid transfer line to be rotated about the post.

The fluid transfer line comprises an upstream tube part, a downstream tube part, and a hollow cylindrical element connecting the upstream tube part to the downstream tube part, the post being connected to the fluid transfer line via the hollow cylindrical element, the hollow cylindrical element allowing fluid to flow through the means of linkage.

The hollow cylindrical element allows for the post to be connected to both the upstream tube part and downstream tube part; hence the baffle can be rotated about the fluid transfer line. The hollow cylindrical element does not inhibit the flow of fluid through the fluid transfer line.

The hollow cylindrical element comprises an upstream end and a downstream end, both having an outer surface, the upstream end and the downstream end being connected to the upstream tube part and the downstream tube part, respectively, using barbs positioned on the outer surfaces.

The barbs allow for both the upstream tube part and the downstream tube part to be easily and securely connected to the hollow cylindrical element. The barbs also prevent both the upstream tube part and the downstream tube part from detaching from the hollow cylindrical element. Moreover, the barbs ensure a watertight connection between the upstream tube part and upstream end, and between the downstream tube part and downstream end.

The upstream tube part and downstream tube part are made of a material chosen between a flexible material, a semi-rigid material or a rigid material. An example of suitable flexible material is nylon (either single layer or multi-layer) which has been designed with a high flexibility (i.e. provided with corrugated sections). A semi-rigid material can be obtained from the same material but without the high-flexibility features. An example of rigid material would be metal.

Thus, the upstream tube part and downstream tube part can be both rigid enough to ensure they are in the proper location inside the tank and/or flexible enough to be easily handled.

The upstream tube part and downstream tube part comprise corrugated sections.

Corrugated sections provide more flexibility to the upstream tube part and downstream tube part.

The post is protruding in an orthogonal direction to the intended flow of fluid through the hollow cylindrical element of the means of linkage.

This orientation of the post ensures that the fluid transfer line is able to rotate towards a surface comprising one of the deflecting surfaces of the baffle. Moreover, this orientation allows for the fluid transfer line to pass through the passing hole in the baffle or through for example an indentation located on the edge of the baffle.

The means of linkage comprises a locking means in order to restrain the bearing around the post.

Thus, the locking means ensures that the bearing is securely connected to the post and cannot slip off.

The locking means is located on the post, the post comprising at least one snap fit tab configured to cooperate with the bearing.

Thus, the snap fit tab alternatively ensures that the bearing is securely connected to the post and cannot slip off.

The post comprises a tip split into at least two parts in order for the tip to be radially deformable, each part of the post forming a snap fit tab.

The radially deformable tip of the post allows for the bearing to be easily inserted over the post. The snap fit tabs ensure that the bearing is securely connected to the post and cannot slip off.

The invention also relates to a tank for a vehicle comprising an assembly according to the invention.

The invention also relates to a method of manufacturing of a vehicle tank, comprising the following steps:
fabricating a plastic vehicle tank comprising a wall having an opening for inner tank access,
manufacturing an assembly according to the invention,
rotating the tube of the fluid transfer line towards a surface comprising one of the deflecting surfaces of the baffle in order to facilitate the insertion of the assembly through the opening in the tank wall,
inserting the assembly into the tank through the opening,
mounting the assembly in the tank.

Thus, using this method of manufacturing, the connection between the baffle and the fluid transfer line does not need to be severely bent. The method of manufacturing is more ergonomic, since the fluid transfer line can be linked to the baffle outside the tank and easily inserted into the tank through the opening.

The term "plastic" is understood to mean any material comprising at least one synthetic polymer resin.

The term "thermoplastic" is understood to mean any thermoplastic polymer, including thermoplastic elastomers, and also blend thereof.

The term "polymer" is understood to mean both homopolymers and copolymers (especially binary or ternary copolymers). Examples of such copolymers are, non-limitingly: random copolymers, linear block copolymers, other block copolymers and graft copolymers.

For a fuller understanding of the present invention, the following description is based on figures, in which.

Figure 1:
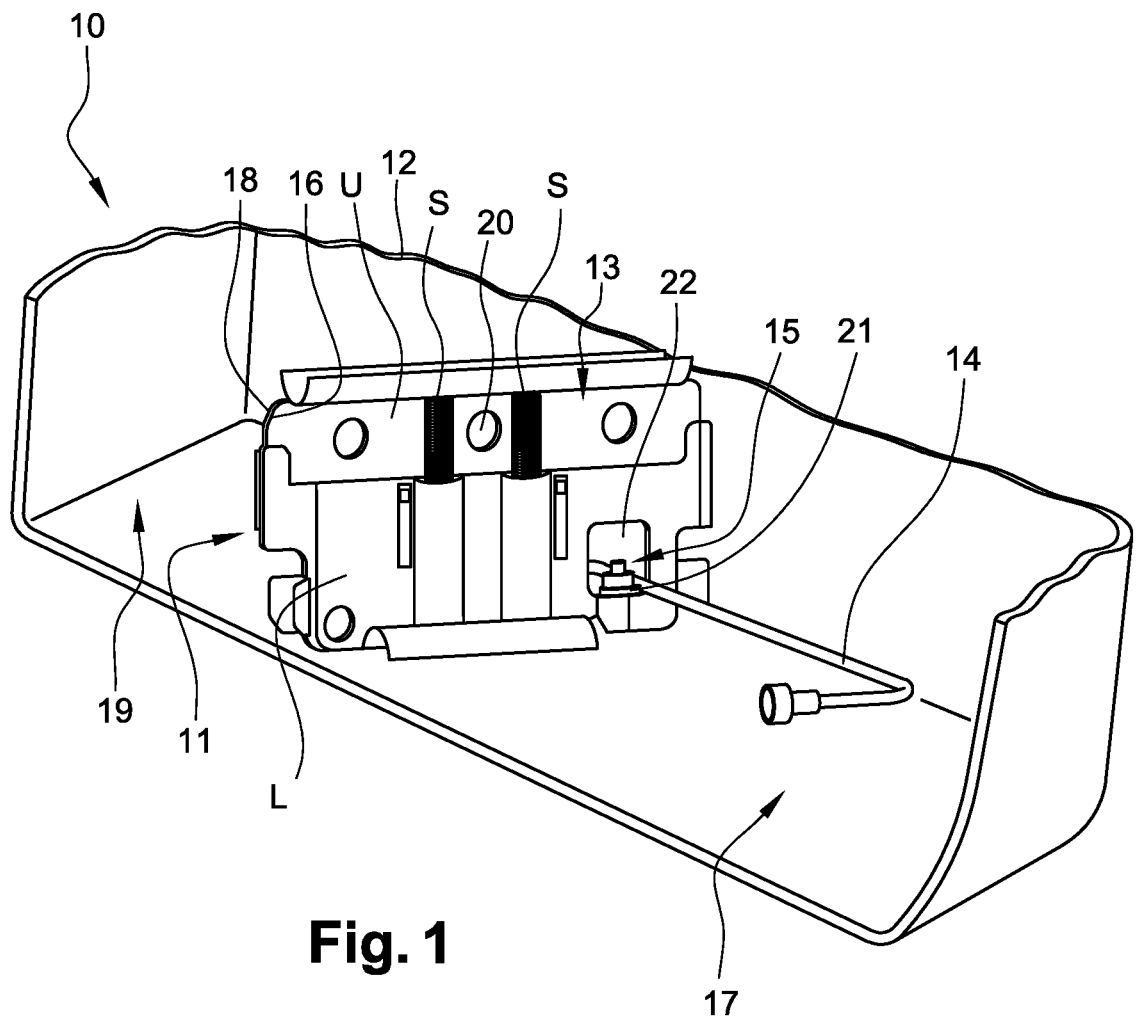
FIG. 1 is a cross sectional view of a part of a tank according to the invention, comprising an assembly according the invention.

FIG. 1 illustrates a vehicle fluid tank 10 according to the invention. The vehicle fluid tank 10 comprises an assembly 11.

The tank 10 is delimited by a wall 12 embodying a sealed enclosure intended for example to contain fuel, a fuel additive, an exhaust gas treatment additive, or any other fluid contained in a vehicle. The fuel additive may for example be chosen from those required to reduce the combustion temperature of the particles retained on the particle filters of the diesel engines. The exhaust gas treatment additive can be, for example, urea or any other ammonia precursor conventionally used in SCR (Selective Catalytic Reduction) equipment.

Advantageously, the tank wall 12 is made of plastic in a manner known per se.

Any type of plastic may be suitable. Particularly suitable plastics belong to the category of thermoplastics.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used. Similarly it is also possible to use a blend of polymeric materials with inorganic, organic and/or natural fillers such as, for example, but non-limitingly: carbon, salts and other inorganic derivatives, natural or polymeric fibers. It is also possible to use multilayer structures composed of stacked and joined layers comprising at least one of the polymers or copolymers described above. One polymer that is often used is polyethylene. Excellent results have been obtained with high-density polyethylene (HDPE).

The tank 10 comprises an opening for inner tank access (not illustrated) to insert accessories into the tank 10, and particularly to insert the assembly 11 according to the invention into the tank 10. The assembly 11 is secured in the tank 10 in a known manner.

The assembly 11 comprises a baffle 13 and a fluid transfer line 14. The baffle 13 is linked to the fluid transfer line 14 by a means of linkage 15 supported by the assembly 11. In the illustrated embodiment, the means of linkage 15 is a pivot linkage. The means of linkage 15 restricts the degree of freedom of the fluid transfer line to 1.

In the illustrated embodiment, the baffle 13 comprises a lower carrier L and an upper sliding part U which can slide relative to the carrier thanks to compression means S, for example springs. Thus, the upper part U can slide by compression of springs S towards the lower carrier L in order to reduce the footprint of the baffle 13 and facilitate the insertion of the assembly 11 into the tank 10 through the opening for inner tank access. Moreover, once the assembly 11 is in the tank 10, springs S decompress and can allow for the lower carrier L and the upper sliding part U to remain in place against the tank wall 12.

In a variant (not illustrated), the means of linkage 15 is a sliding pivot linkage. In this variant, the means of linkage 15 restricts the degree of freedom of the fluid transfer line to 2.

The baffle 13 comprises a first deflecting surface 16 intended to define a first part 17 of the tank 10 and a second deflecting surface 18 intended to define a second part 19 of the tank 10.

Both deflecting surfaces 16 and 18 are intended to cooperate with the fluid contained in the tank 10 in order to limit sloshing noise and both deflecting surfaces 16 and 18 comprise at least one hole 20 allowing the passage of fluid.

The fluid transfer line 14 extends from the first part 17 to the second part 19 of the tank 10.

The fluid transfer line 14 is linked to an internal peripheral edge 21 of the baffle 13. In a variant, the fluid transfer line 14 can be linked close to the internal peripheral edge 21 of the baffle 13.

The internal peripheral edge 21 of the baffle 13 defines a passing hole 22 extending between the first deflecting surface 16 and the second deflecting surface 18 of the baffle 13. The fluid transfer line 14 passes through the passing hole 22 in the baffle 13, thus, the fluid transfer line 14 passes through the baffle 13.

The means of linkage 15 allows for rotation of the fluid transfer line 14 towards a surface comprising one of the deflecting surfaces 16 and 18.

Figure 2:
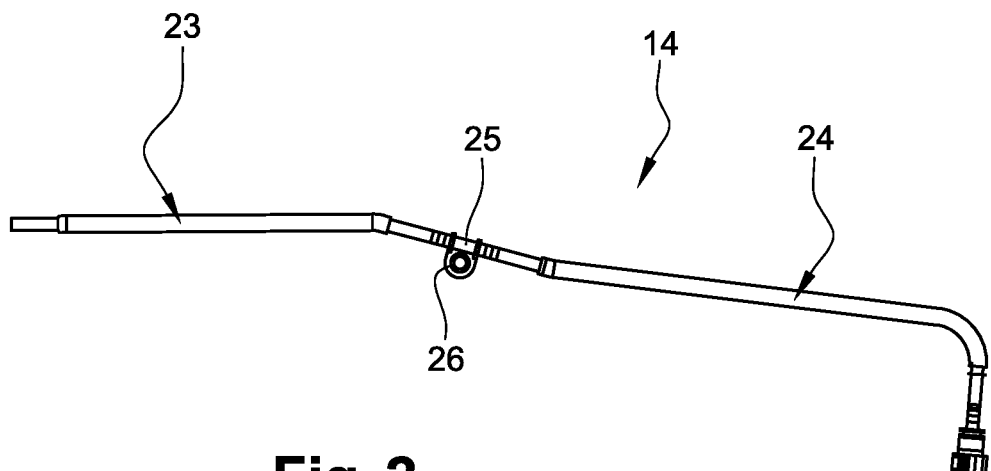
FIG. 2 is a top view of a fluid transfer line comprising an upstream tube part, a downstream tube part, and a bearing of a means of linkage.

FIG. 2 illustrates the fluid transfer line 14. The fluid transfer line 14 comprises an upstream tube part 23 and a downstream tube part 24 connected by a hollow cylindrical element 25.

The upstream tube part 23 and the downstream tube part 24 are made of a semi-rigid material and advantageously comprise corrugated sections in order to provide more flexibility to the upstream tube part 23 and the downstream tube part 24. The upstream tube part 23 and the downstream tube part 24 can also be made in a flexible or a rigid material.

The end of the upstream tube part 23 is intended to be in contact with the fluid in the tank 10 whereas the end of the downstream tube part 24 is intended to be linked to a device, for example a fuel pump.

Furthermore, a bearing 26 is molded to the hollow cylindrical element 25.

Figure 3:
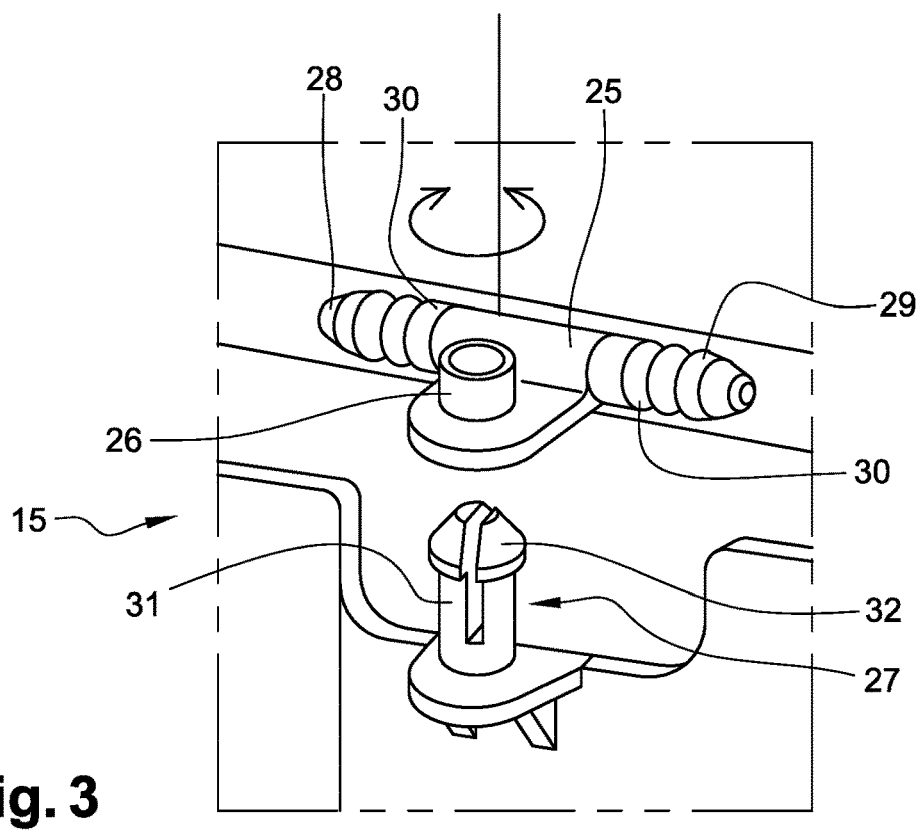
FIG. 3 is a detail view of an assembly according the invention showing the means of linkage before the fluid transfer line is linked to the baffle and in which the fluid transfer line is linked to an internal peripheral edge of the baffle.

FIG. 3 shows the means of linkage 15 comprising the bearing 26, a post 27 and the hollow cylindrical element 25. FIG. 3 illustrates the means of linkage 15 before the post 27 receives the bearing 26.

The post 27 is supported by the baffle 13. The hollow cylindrical element 25 being molded with the bearing part 26, the bearing 26 is connected to the fluid transfer line 14. The hollow cylindrical element 25 allows fluid intended to flow in the upstream 23 and downstream 24 parts to flow through the means of linkage 15.

The hollow cylindrical element 25 comprises an upstream end 28 and a downstream end 29. Both ends 28 and 29 have an outer surface comprising barbs 30. The upstream end 28 of the hollow cylindrical element 25 is connected to the upstream tube part 23. The downstream end 29 of the hollow cylindrical element 25 is connected to downstream tube part 24. The upstream tube part 23 and the downstream tube part 24 are easily and securely connected to the hollow cylindrical element thanks to the barbs 30. Thus, the barbs 30 prevent the upstream tube part 23 and the downstream tube part 24 from detaching from the hollow cylindrical element 25. Moreover the barbs 30 ensure a watertight connection between the upstream tube part 23 and upstream end 28 of the hollow cylindrical element 25, and between the downstream tube part 29 and downstream end 29 of the hollow cylindrical element 25.

The post 27 is protruding in an orthogonal direction to the intended flow of fluid through the hollow cylindrical part 25 of the means of linkage 15.

The post 27 comprises a locking means 31 allowing the bearing 26 to be securely connected to the post 27 and preventing the bearing 26 from slipping off.

The locking means 31 is located on the post 27 comprising at least one snap fit tab 32 configured to cooperate with the bearing 26. As can be seen on FIGS. 3 and 4, the post 27 comprises a tip split into two parts. Thus, the tip is radially deformable and each part of the post 27 forms a snap fit tab 32.

Figure 4:
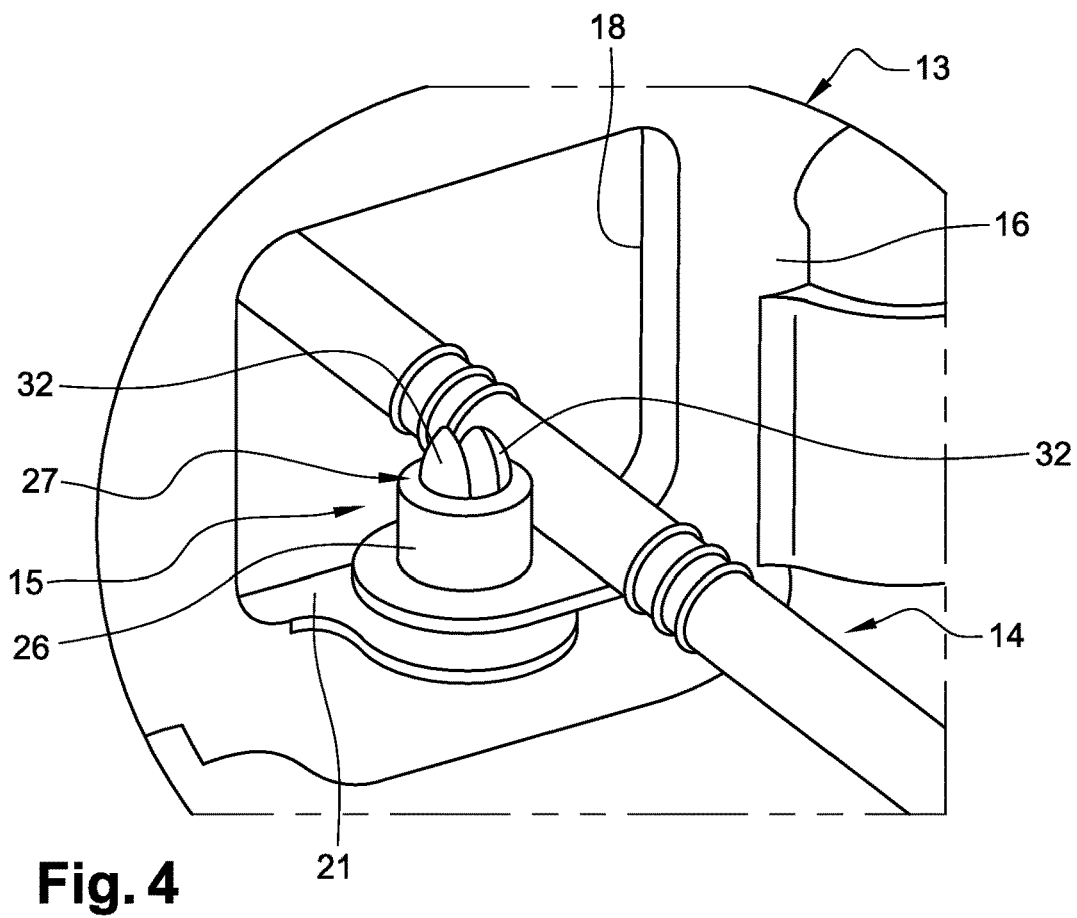
FIG. 4 is a similar view to FIG. 3 with the fluid transfer line being linked to the baffle.

FIG. 4 illustrates the fluid transfer line 14 linked to an internal peripheral edge 21 of the baffle 13. The bearing 26 is restrained around the post 27 thanks to the snap fit tabs 32.

The internal peripheral edge 21 of the baffle 13 defines the passing hole 22. The fluid transfer line 14 passes through the passing hole 22 in the baffle 13. The post 27 provides a location for the bearing 26 to rotate about. Thus, the bearing 26 being connected to the baffle 13 allows for the fluid transfer line 14 to be rotated about the post 27 and the fluid transfer line 14 can be easily rotated towards a surface comprising one of the deflecting surfaces 16 and 18 of the baffle 13. When the fluid transfer line 14 rotates towards a surface comprising one of the deflecting surfaces 16 and 18, the footprint of the assembly 11 is limited.

Figure 5:
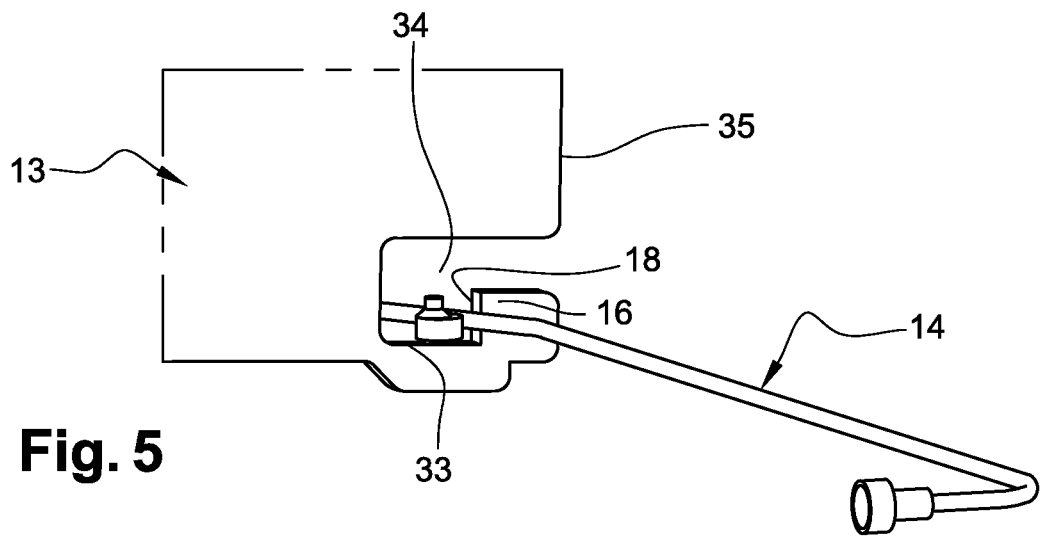
FIG. 5 is a similar view to FIG. 4 showing a variant of the invention in which the fluid transfer line is linked to an external peripheral edge of the baffle.

FIG. 5 illustrates a variant in which the fluid transfer line 14 is linked to an external peripheral edge 33 of the baffle 13. In this variant, the external peripheral edge 33 defines an indentation 34 located on an edge 35 of the baffle 13. Thus, the fluid transfer line 14 rotates easily towards a surface comprising one of the deflecting surfaces 16 and 18, the footprint of the assembly 11 is limited.

Figure 6:
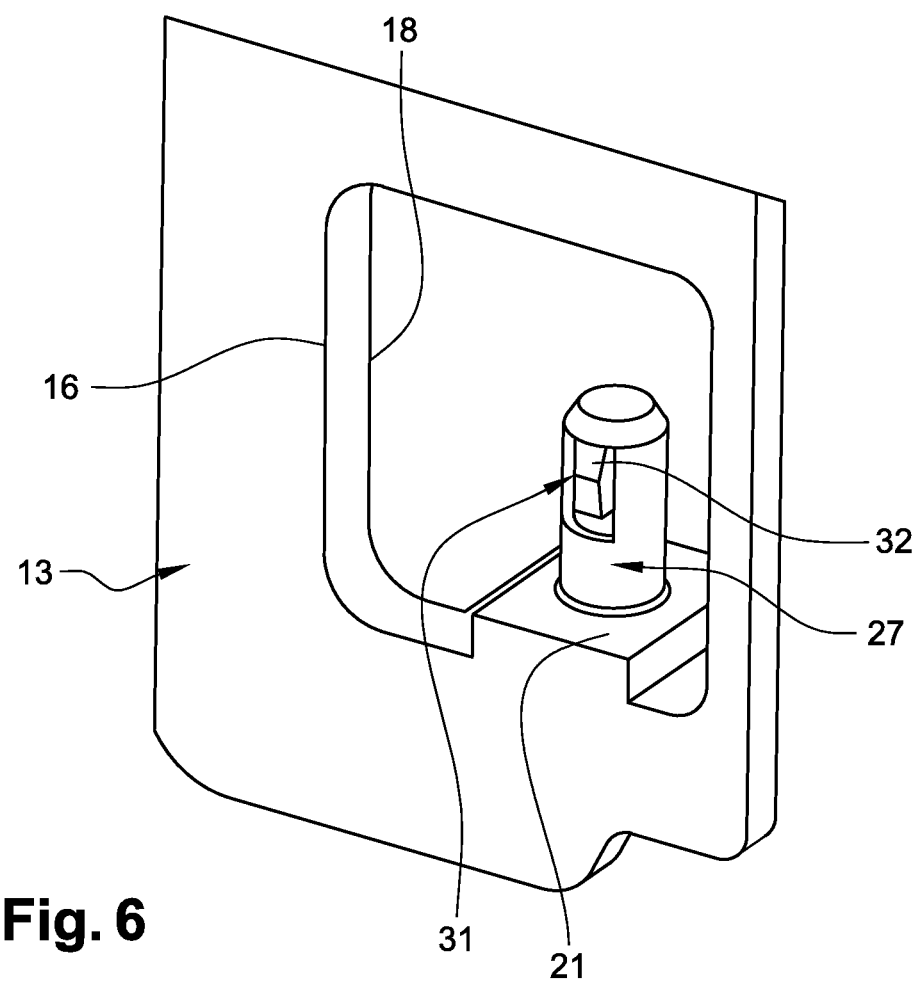
FIG. 6 is a detail view of an assembly according the invention showing a variant of the invention before the fluid transfer line is linked to the baffle in which the post comprises two snap fit tabs.

FIG. 6 illustrates another variant in which the post 27 is hollow and comprises a locking means 31. The locking means 31 comprises two snap fit tabs 32 opposite each other configured to cooperate with the bearing 26. Thus, the bearing 26 is securely connected to the post 27 and cannot slip off. Moreover, the bearing 26 is restrained around the post 27.

Figure 7:
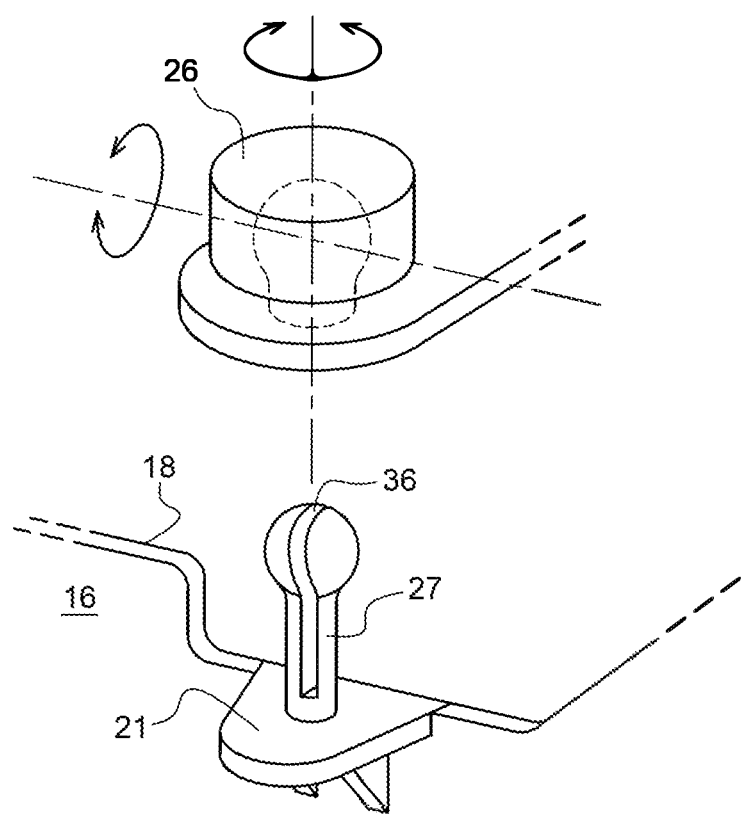
FIG. 7 is a detail view of an assembly according to the invention showing a variant of the invention before the fluid transfer line is linked to the baffle in which the post comprises two snap fit tabs and is conformed as a ball joint.

FIG. 7 illustrate a preferred embodiment of the invention wherein the bearing 26 and the post 27 are arranged as a ball joint in order to allow a smooth movement in all directions. The post 27 is provided with a central slot 36 and is configured to cooperate with the bearing 26. The slot will allow the insertion of the bearing 26 that will then remain locked on the post 27. The advantage of this embodiment is that the transfer line can be folded down very efficiently against the baffle 13; this is particularly useful in case of complex geometry of the tank opening. According to another preferred embodiment not depicted on the figures, the post 27 is plain (unslotted) and the bearing periphery is provided with a slot to allow the insertion of the bearing 26 that will then remain locked on the post 27.

We will describe a method of manufacturing a vehicle tank comprising an assembly 11 according to the invention.

Firstly, a plastic vehicle tank 10 is fabricated. The wall 12 of the plastic tank 10 comprises an opening for inner tank access.

Secondly, an assembly 11 according to the invention is manufactured prior to being inserted into the tank 10, that is to say the baffle 13 is linked to the fluid transfer line 14 by connecting the post 27 to the bearing 26. Thus, the fluid transfer line 14 is easily and correctly connected to the baffle 13.

Then, the upstream tube part 23 and the downstream tube part 24 of the fluid transfer line 14 are rotated towards a surface comprising one of the deflecting surfaces 16 and 18 of the baffle 13. Thus, the footprint of the assembly 11 is limited.

The next step is to insert the assembly 11 into the tank 10 through the opening. The limited footprint of the assembly 11 facilitates its insertion 11 through the opening in the tank wall 12 and prevents damage to the assembly 11, such as kinking or tearing the fluid transfer line 14. Advantageously, springs S are compressed towards the lower carrier L of the baffle 13 in order to reduce the footprint of the baffle 13 and further facilitate the insertion of the assembly 11 into the tank 10 through the opening for inner tank access.

Finally the assembly 11 is mounted in the tank 10, that is to say, for example, that the baffle 13 is hung in the tank 10 and that the end of the downstream tube part 24 is linked to a device, for example a fuel pump. In the case of a vapor line, the internal line may connect to an internal active or passive component, for example a venting valve, liquid vapor separator, or vent port.

The following detailed description and examples are provided for the purpose of non-exhaustively describing some, but not necessarily all, examples or embodiments of the invention, and shall not limit the scope of the invention in any way.

Indeed, the present invention was described with respect to particular embodiment and variants, and with reference to certain drawings. However, the invention is not limited thereto but only by the claims. The drawings described are only schematic and non-limiting. In the drawings, the size of some of the elements may be exaggerated and not drawn to scale for illustrative purposes. The dimensions and the relative dimensions shown in drawings do not represent the actual dimensions of the invention.

The invention claimed is:

1. An assembly for a fluid tank comprising:
   a baffle, comprising a first deflecting surface intended to define a first part of the tank and a second deflecting surface intended to define a second part of the tank; and
   a fluid transfer line intended to extend from the first part to the second part and being linked to the baffle by a linkage supported by the assembly,
   wherein the extension of the fluid transfer line in the first part defines a first portion of the fluid transfer line,
   wherein the extension of the fluid transfer line in the second part defines a second portion of the fluid transfer line, and
   wherein the linkage allows for simultaneous rotation of the first portion and the second portion of the fluid transfer line towards a surface comprising one of the deflecting surfaces, wherein a rotation angle of the simultaneous rotation is between 10 and 60° relative to a line perpendicular to the baffle.

2. The assembly according to claim 1, wherein the fluid transfer line is linked to an internal peripheral edge of the baffle defining a passing hole extending between the two deflecting surfaces of the baffle, the fluid transfer line passing through the passing hole in the baffle.

3. The assembly according to claim 1, wherein the fluid transfer line is linked to an external peripheral edge of the baffle defining an indentation located on the edge of the baffle.

4. The assembly according to claim 1, wherein the linkage is chosen between a pivot linkage and a sliding pivot linkage.

5. The assembly according to claim 4, wherein the linkage comprises a post supported by the baffle and a bearing connected to the fluid transfer line, the post being configured to receive a bearing.

6. The assembly according to claim 5, wherein the fluid transfer line comprises an upstream tube part, a downstream tube part, and a hollow cylindrical element connecting the upstream tube part to the downstream tube part, the bearing being connected to the fluid transfer line via the hollow cylindrical element, the hollow cylindrical element allowing fluid to flow through the linkage.

7. The assembly according to claim 6, wherein the hollow cylindrical element comprises an upstream end and a downstream end, both having an outer surface, the upstream end and the downstream end being connected to the upstream tube part and the downstream tube part, respectively, using barbs positioned on the outer surfaces.

8. The assembly according to claim 6, wherein the upstream tube part and downstream tube part are made of a material chosen between a flexible material, a semi-rigid material or a rigid material.

9. The assembly according to claim 8, wherein the upstream tube part and downstream tube part comprise corrugated sections.

10. The assembly according to claim 5, wherein the post is protruding in an orthogonal direction to the intended flow of fluid through the hollow cylindrical element of the linkage.

11. The assembly according to claim 5, wherein the linkage comprises a locking means in order to restrain the bearing around the post.

12. The assembly according to claim 11, wherein the locking means is located on the post, the post comprising at least one snap fit tab configured to cooperate with the bearing.

13. The assembly according to claim 12, wherein the post comprises a tip split into at least two parts in order for the tip to be radially deformable, each part of the post forming a snap fit tab.

14. The assembly according to claim 4, wherein the linkage comprises a post supported by the fluid transfer line and a bearing connected to the baffle, the post being configured to receive the bearing.

15. The assembly according to claim 14, wherein the fluid transfer line comprises an upstream tube part, a downstream tube part, and a hollow cylindrical element connecting the upstream tube part to the downstream tube part, the post being connected to the fluid transfer line via the hollow cylindrical element, the hollow cylindrical element allowing fluid to flow through the linkage.

16. The assembly according to claim 1, wherein a rotation angle of the simultaneous rotation is larger than 10°.

17. A tank for a vehicle, comprising an assembly according to claim 1.

18. A method of manufacturing of a vehicle tank, comprising:
fabricating a plastic vehicle tank comprising a wall having an opening for inner tank access;
manufacturing an assembly according to claim 1;
rotating the fluid transfer line towards a surface comprising one of the deflecting surfaces of the baffle in order to facilitate the insertion of the assembly through the opening in the tank wall;
inserting the assembly into the tank through the opening; and
mounting the assembly in the tank.

* * * * *